United States Patent [19]

Horyu

[11] 4,421,950
[45] Dec. 20, 1983

[54] COMMUNICATION DEVICE HAVING COUPLING MEANS

[75] Inventor: Sakae Horyu, Yokohama, Japan

[73] Assignee: Canon Kabushiki Kaisha, Tokyo, Japan

[21] Appl. No.: 213,592

[22] Filed: Dec. 5, 1980

[30] Foreign Application Priority Data

Dec. 18, 1979 [JP] Japan .............................. 54-163474

[51] Int. Cl.$^3$ .......................................... H04M 11/00
[52] U.S. Cl. .................................. 179/2 DP; 179/2 C
[58] Field of Search .................... 179/2 DP, 2 C, 1 C; 375/8, 9

[56] References Cited

U.S. PATENT DOCUMENTS 3,889,062  6/1975  Epstein ............................ 179/2 DP
3,932,709  1/1976  Hoff et al. ................... 179/2 DP X
4,291,198  9/1981  Anderson et al. ............... 179/2 DP Primary Examiner—C. D. Miller
Assistant Examiner—W. J. Brady
Attorney, Agent, or Firm—Fitzpatrick, Cella, Harper & Scinto

[57] ABSTRACT

A communication device, wherein a state of coupling of a signal to be emitted and signal to be received is controlled by mounting and dismounting of a coupler, then the signal to be emitted is introduced as an input from an input device of a terminal device, while the signal to be received is produced as an output to an output device of the terminal device, and further, at the time of mounting the coupler, communication is carried out with communication lines through the coupler, while, at the time of dismounting the coupler, the information input from the input device is recorded or displayed by the output device.

8 Claims, 2 Drawing Figures

COMMUNICATION DEVICE HAVING COUPLING MEANS

BACKGROUND OF THE INVENTION

1. Field of the Invention

This invention relates to a communication device of a construction, wherein a state of coupling of signals is controlled by mounting or dismounting of a coupler so as to effect emission of input informations to communication lines and recording or displaying of the input informations.

2. Description of the Prior Art

FIG. 1 of the accompanying drawing to this application illustrates one structural embodiment of a conventional communication device, wherein a terminal device is coupled with telephone lines through an acoustic coupler so as to enable communication to be done between the terminal devices through the telephone line.

In this embodiment, TEM1, TEM2, refer to terminal devices, KB1, KB2 refer to key boards, PRT1, PRT2 designate printers, CTL1, CTL2 denote control circuits, and ITF1, ITF2 refer to interfaces. When a key of the key board KB1 in the terminal device TEM1 is depressed, an information is printed on the printer PRT1, and, at the same time, sent out from the interface ITF1 (coupling means) to a telephone circuit TEL through an acoustic coupler ACC1 which is connected with, for example, a telephone. The transmitted information is supplied to the opposite terminal device TEM2 through an acoustic coupler ACC2 of the opposite terminal. In the terminal device TEM2, an information as received is printed by the printer PRT2.

In the above-described communication system, when the information is transmitted in a varied form due to noises, etc. in the telephone line TEL, such variation in the transmitted information cannot be made known at the emitter side, e.g., at the side of the terminal device TEM1. As a method for eliminating such defect in transmission, it may be contemplated that the signal received at the receiver side, e.g., at the side of the terminal device TEM2, and demodulated by the acoustic coupler ACC2 is again modulated and sent back to the emitter side TEM1, while the emitter side TEM1 records the returned signal by means of the printer PRT1 and determines whether the recorded information is the same as that initially sent out, or not, thereby judging propriety of the initial emission. That is, when the information varies during transmission, there would be printed in the printer PRT1 of the emitter side an information different from that sent out by depression of the key, on account of which an operator of the terminal device TEM1 is able to know any change in the information during its transmission.

Incidentally, there is an occasion such that, besides the abovementioned mutual communication, the terminal devices TEM1, TEM2 are required to be used independently such as, for example, when the deaf and dumb persons want to use such terminal device as a conversational device. In such instance, it might be desired that the terminal device TEM1 alone be used individually by removing the acoustic coupler ACC1. However, as in the above-described construction, where the printer PRT1 of the terminal device TEM1 performs its print-out with the signal which has been returned from the opposite terminal device TEM2, the printer PRT1 does not operate even by depression of a key of the key board KB1 in an attempt to use the terminal device TEM1 alone without the acoustic coupler ACC1. As a solution of such situation, there may be contemplated connection of an artificial circuit as an adaptor with the interfaces ITF1, ITF2 of the respective terminal devices TEM1, TEM2. However, an appliance such as the adaptor is liable to be lost in its use, and, once lost, the terminal device alone is no longer useful.

SUMMARY OF THE INVENTION

It is therefore an object of the present invention to provide a communication device capable of switching over a route of a signal by simple mounting and dismounting of a coupler.

It is another object of the present invention to provide a communication device capable of completing the information processing by its own terminal device, when no coupler is used.

It is still another object of the present invention to provide a communication device capable of recording or displaying the received input information by one and the same terminal device.

DESCRIPTION OF THE PREFERRED EMBODIMENT

In the following, the present invention will be described in detail by reference to the accompanying drawing.

Figure 1:
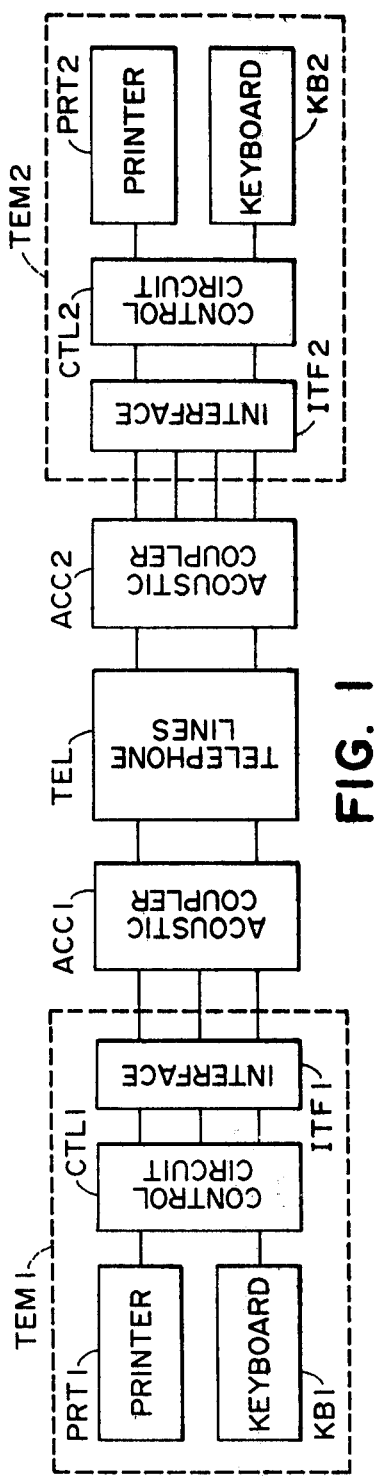
FIG. 1 is a block diagram showing a communication system in an ordinary communication device.
Figure 2:
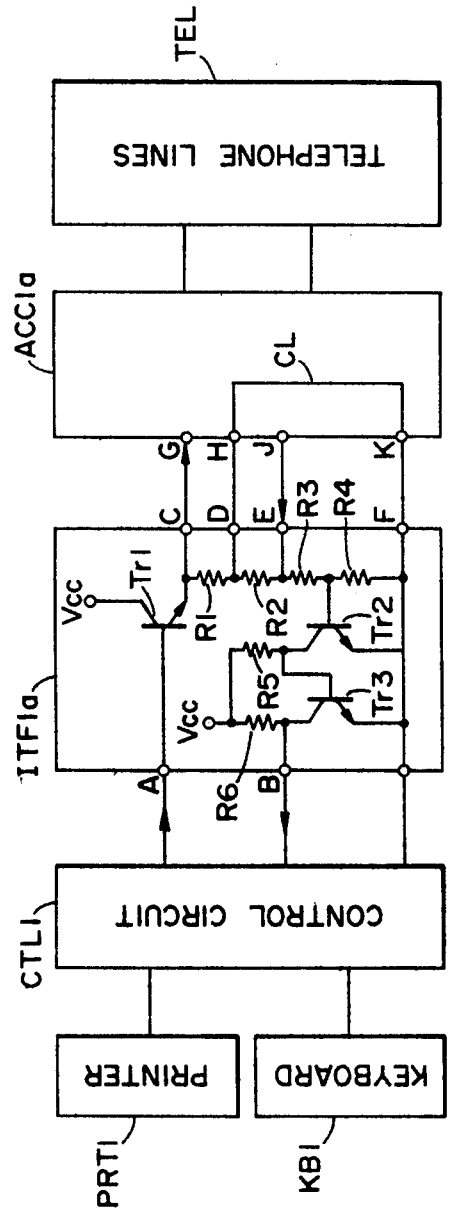
FIG. 2 is a wiring diagram, including a partial block diagram, of one embodiment of the communication device according to the present invention.

The terminal devices for the communication device according to the present invention are constructed as shown, for example, in FIG. 2, wherein the key board KB1, the printer PRT1, and the control circuit CTL1 can be constructed in the same manner as those shown in FIG. 1. In FIG. 2, an interface ITF1a includes an output circuit constructed with a transistor Tr1 as an emitter follower, and an input circuit constructed with transistors Tr2, Tr3, serving as amplifiers. Resistors R1, R2, R3, and R4 form a coupling circuit to connect the output circuit and the input circuit, both ends of which permit generation of a potential difference. Resistors R5, R6 serve as collector resistances for the transistors Tr2,Tr3. VCC refers to a power source. A signal sent out of the control circuit CTL1 is supplied to the output circuit through its input terminal A, passes through the emitter follower transistor Tr1 thereof, and is led to an input terminal G of an acoustic coupler ACC1a from an output terminal C. A signal from an output terminal J of the acoustic coupler ACC1a enters into an input terminal E of the output circuit, and is supplied to the control circuit CTL1 from an output terminal B through the amplifying transistors Tr2, Tr3 constituting the input circuit. A terminal F of the interface ITF1a and a terminal H of the acoustic coupler ACC1a are common potential terminals. In other words, in the embodiment according to the present invention, it is possible to connect a terminal K in the acoustic coupler ACC1a with the terminal H through a control line CL, and to further connect this terminal H with a terminal D pulled out of a junction between the emitter follower resistors R1, R2 of the interface ITF1a. It should be understood here that the interface ITF1a and the acoustic coupler ACC1a are connectable through their respective terminals C and G, D and H, E and J, and F and K.

When the acoustic coupler ACC1a (coupler) is connected with the interface ITF1a (coupling means), the terminal D of the interface ITF1a is connected at a common potential through the control line CL, so that the resistance R1 alone constitutes the emitter resistance of the emitter follower transistor Tr1. Accordingly, the information signal supplied to the input terminal A from the control circuit CTL1 is applied to the terminal G of the acoustic coupler ACC1a from the terminal C through the emitter follower as the output circuit which is constructed with the transistor Tr1 and the resistor R1. On the other hand, a signal which has been conveyed through telephone lines TEL from the opposite terminal device TEM2 is demodulated in the acoustic coupler ACC1a, and applied to the terminal E of the interface ITF1a from its terminal J. Since the junction between the resistors R1, R2 is connected at a common potential, both output and input circuits are completely separated without mutual influence between them, and an input signal is applied to a circuit constructed by parallel connection of the resistor R2 with the serial circuit of the resistors R3 and R4. After it is amplified by the transistors Tr2, Tr3, the signal is supplied to the control circuit CTL1 through the output terminal B.

In the following, explanations will be given as to a case where the acoustic coupler ACC1a is eliminated. In the absence of the coustic coupler ACC1a, the terminal D is isolated from the common potential, and form the resistors R1, R2, R3 and R4 the emitter resistance of the emitter follower constructed with the transistor Tr1. In this consequence, a signal applied to the input terminal A of the interface ITF1a appears at both ends of the serial circuit of the resistors R1, R2, R3 and R4 connected to the emitter of the transistor Tr1. An output signal at the emitter of the transistor Tr1 is divided in accordance with resistance ratios among the resistors R1, R2, R3 and R4, and the signal as appeared at both ends of the resistor R4 is applied to the base of the transistor Tr2. That is to say, the output signal is supplied to the transistors Tr2, Tr3 in the input circuit through an external artificial circuit (coupling circuit) formed by the resistors R1 through R4, and returned to the control circuit CTL1a from the output terminal B.

As stated in the foregoing, according to the present invention, when the acoustic coupler as the coupling device for coupling the terminal device and the communication lines is removed, the output signal from the terminal device is immediately applied as an input signal to one and the same terminal device through an artificial circuit, but, when the acoustic coupler is connected, the input and output circuits of the terminal device are perfectly separated. As the consequence of this, even when the terminal device is used independently, no external adaptor needs be attached, which could eliminate the conventional problem of possible loss of the adaptor, and moreover, the terminal device per se becomes able to exhibit the function of completing the information processing.

So far, the explanations have been made as to an instance of using the acoustic coupler by coupling it between the terminal device and the telephone line. It is, however, apparent that the present invention is applicable even in the case of using other type of couplers such as, for example, an optical coupler. Moreover, in the present embodiment, the telephone line is used as the communication line, although it is possible to use other kinds of communication lines.

What I claim is:

1. A communication device comprising:
   input means for introducing input information;
   output means for recording or displaying the information to produce an output of the information;
   control means connected to said input means and said output means for controlling the input and the output, respectively, of the information; and
   coupling means including a first input portion for introducing the information from said control means, a first output portion for providing the information from said first input portion to an external unit, a second input portion for introducing the information from the external unit, a second output portion for providing the information introduced from said second input portion to said control means, a connection portion connected to the external unit, and coupling elements for coupling said first output portion to said second input portion through said connection portion, said coupling means providing the information introduced from said first input portion to said second output portion through said coupling elements.

2. A communication device according to claim 1, wherein said input means comprises a keyboard, and said output means comprises a printer.

3. A communication device according to claim 1, wherein said device further comprises a coupler detachably connected to a control portion of said coupling means and said first output portion and said second input portion, said coupler having a control line for inhibiting the information introduced from said first input portion from being provided to said second output portion by connecting a connection part of said coupling means to a predetermined potential, means for modulating an input signal introduced from said first output portion and sending the modulated signal to a communication line, and means for demodulating a signal received from said communication line and producing the demodulated signal to said second input portion.

4. A communication device according to claim 2, wherein said device further comprises a coupler detachably connected to a control portion of said coupling means, and said first output portion, and said second input portion, said coupler having a control line for inhibiting the information introduced from said first input portion from being provided to said second output portion by connecting a connection part of said coupling means to a predetermined potential, means for modulating an input signal introduced from said first output portion and sending the modulated signal to a communication line, and means for demodulating a signal received from said communication line and producing the demodulation signal to said second input portion.

5. A communication device comprising:
   input means for introducing input information;
   output means for recording or displaying the input information to produce an output of said information;
   control means connected to said input means and said output means for controlling an input of the information into said input means and an output of the information from said output means;

coupling means for providing a signal from said control means through a plurality of serially connected resistors to said control means; and a coupler detachably connected to said coupling means, said coupler provides the information from a first end of said plurality of resistors to a communication line, and disconnects a first portion from a second end of said plurality of resistors to provide the information from said communication line to a second portion of said plurality of resistors.

6. A communication device according to claim 5, wherein said input means comprises a keyboard, and said output means comprises a printer.

7. A communication device according to claim 5, wherein said coupler comprises an acoustic coupler connected to a telephone line.

8. A communication device according to claim 6, wherein said coupler comprises an acoustic coupler connected to a telephone line.

* * * * *